(12) United States Patent
Watanabe et al.

(10) Patent No.: US 6,253,547 B1
(45) Date of Patent: Jul. 3, 2001

(54) APPARATUS AND METHOD FOR DETERMINING AMOUNT OF UNBURNED FUEL COMPONENT ADSORBED BY AN ADSORBENT IN AN INTERNAL COMBUSTION ENGINE

(75) Inventors: Takashi Watanabe; Koichi Hoshi, both of Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/479,929

(22) Filed: Jan. 10, 2000

(30) Foreign Application Priority Data

Feb. 12, 1999 (JP) .................................................. 11-034019

(51) Int. Cl.[7] ...................................................... F01N 3/00
(52) U.S. Cl. .................................. 60/297; 60/274; 60/299
(58) Field of Search ............................. 60/288, 295, 297, 60/311, 277

(56) References Cited

U.S. PATENT DOCUMENTS 5,983,630 * 11/1999 Kibe et al. ............................. 60/285

FOREIGN PATENT DOCUMENTS

| 6-058139 | 3/1994 | (JP) . |
| 6-093829 | 4/1994 | (JP) . |
| 6-093840 | 4/1994 | (JP) . |
| 6-093846 | 4/1994 | (JP) . |
| 6-173653 | 6/1994 | (JP) . |
| 6-257424 | 9/1994 | (JP) . |
| 7-139393 | 5/1995 | (JP) . |
| 10-331625 | 12/1995 | (JP) . |

* cited by examiner

*Primary Examiner*—Thomas Denion
*Assistant Examiner*—Diem Tran
(74) *Attorney, Agent, or Firm*—Oliff & Berridge PLC

(57) ABSTRACT

In an internal combustion engine equipped with an adsorbent for adsorbing unburned fuel components, the amount of unburned fuel components adsorbed to the adsorbent is determined with good precision. The amount of fuel components adhered in a passage that is located upstream of the adsorbent and that conducts fuel components is determined. By taking into consideration the determined amount of adhered fuel components, the amount of fuel components adsorbed to the adsorbent is determined.

22 Claims, 9 Drawing Sheets

APPARATUS AND METHOD FOR DETERMINING AMOUNT OF UNBURNED FUEL COMPONENT ADSORBED BY AN ADSORBENT IN AN INTERNAL COMBUSTION ENGINE

INCORPORATION BY REFERENCE

The disclosure of Japanese Patent Application No. HEI 11-34019 filed on Feb. 12, 1999 including the specification, drawings and abstract is incorporated herein by reference in its entirety.

BACKGROUND OF THE INVENTION

1. Field of Invention

The present invention relates to a technology for a system in which an adsorbent is provided in an exhaust passage of an internal combustion engine for adsorbing unburned fuel components in exhaust gas, the technology being capable of determining an amount of unburned fuel components adsorbed to the adsorbent.

2. Description of Related Art

A typical internal combustion engine installed in a motor vehicle or the like is equipped with an emission control catalyst device provided in a pathway of an exhaust passage for substantially eliminating or lessening harmful gas components present in the exhaust gas. An example of such an emission control catalyst device is a three-way catalyst device in which a surface of a ceramic support is coated with alumina, and the alumina surface is loaded with a platinum-rhodium-based precious-metal catalytic substance. This type of three-way catalyst device causes hydrocarbons (HC) and carbon monoxide (CO) contained in exhaust gas to react with oxygen ($O_2$) present in exhaust gas, thereby oxidizing them into water ($H_2O$) and carbon dioxide ($CO_2$), when the air-fuel ratio of exhaust gas flowing into the catalyst device is at or close to the theoretical air-fuel ratio. Simultaneously, the three-way catalyst device causes oxides of nitrogen (NOx) present in exhaust gas to react with hydrocarbons (HC) and carbon monoxide (CO) present in exhaust gas, thereby reducing NOx into water ($H_2O$), carbon dioxide ($CO_2$) and nitrogen ($N_2$).

The above-described three-way catalyst device is able to substantially eliminate or lessen unburned hydrocarbons, carbon monoxide, and oxides of nitrogen contained in exhaust gas, thereby preventing those harmful gas components from being released into the atmosphere.

Normally, the three-way catalyst device activates at or above a predetermined activation temperature (e.g., 800° C. to 500° C.) so as to significantly lessen harmful gas components in exhaust gas. That is, when the temperature of the catalyst device is below the activation temperature, the catalyst device is inactive and cannot significantly lessen harmful gas components in the exhaust gas.

Particularly, at the time of a cold start of the internal combustion engine, combustion in the engine becomes unstable while the amount of fuel injected is increased from a normal level in order to facilitate the start of the engine and to accelerate warm-up. Therefore, the amount of unburned fuel components (e.g., hydrocarbons) contained in exhaust gas increase in some cases. If the three-way catalyst device is not activated in such a case, there is a possibility that unburned hydrocarbons will not be significantly lessened, but will be released in large amounts into the atmosphere.

To overcome this problem, a technology has been proposed in which an exhaust passage is provided with an HC adsorbent that is formed from a porous zeolite material or the like and that adsorbs unburned hydrocarbons in exhaust gas when a predetermined temperature is not reached, and that desorbs unburned hydrocarbons (previously adsorbed) when the predetermined temperature is reached or exceeded. When a three-way catalyst device is inactive, unburned hydrocarbons in exhaust gas are caused to adsorb to the HC adsorbent so as to prevent release of unburned hydrocarbons into the atmosphere.

If an internal combustion engine is equipped with an HC adsorbent as described above, it may be conceivable to estimate an amount of unburned hydrocarbons adsorbed to the HC adsorbent and, on the basis of the estimated value, determine whether the HC adsorbent has deteriorated. To realize this goal, it is important to accurately estimate an amount of unburned hydrocarbons adsorbed to the HC adsorbent.

As a technology that addresses such a requirement, an internal combustion engine emission control apparatus is described in Japanese Patent Application Laid-Open No. HEI 6-93846. The emission control apparatus detects the amount of hydrocarbons discharged from the engine, the flow rate of exhaust gas passing through an HC adsorbent, and the temperature of the HC adsorbent. Based on the detected values, the apparatus estimates a total amount of hydrocarbons adsorbed to the HC adsorbent.

In the apparatus described in JP 6-93846, the amount of unburned hydrocarbons discharged from the internal combustion engine is calculated on the basis of the amount of fuel injected, the degree of fuel vaporization (which is estimated from the temperature of engine-cooling water), the flow of exhaust gas (which is estimated from the engine revolution speed), and the like. Subsequently, a rate of adsorption to the HC adsorbent is estimated from the flow rate of exhaust gas passing through the HC adsorbent and the temperature of the HC adsorbent. Based on the rate of adsorption to the HC adsorbent and the amount of unburned hydrocarbons discharged from the internal combustion engine, an amount of unburned hydrocarbons expected to be adsorbed by the HC adsorbent is estimated.

Under a condition where unburned hydrocarbons in exhaust gas are caused to adsorb to the adsorbent, passage portions that are located upstream of the adsorbent and that conduct fuel components, such as an intake passage, a combustion chamber, an exhaust passage and the like, have relatively low temperatures, so that those passage portions are likely to receive adherents in the fuel components. Therefore, the amount of unburned fuel components actually adsorbed to the adsorbent varies in accordance with the amounts of fuel components adhered to wall surfaces or the like of the passage portions.

Particularly at the time of a cold start of an internal combustion engine, the temperatures of the intake passage, the combustion chamber, the exhaust passage and the like are relatively low, so that fuel components do not readily vaporize but are likely to adhere to wall surfaces of the passages. If the amount of such unburned hydrocarbon adherents is not taken into account, it becomes difficult to precisely determine an amount of unburned hydrocarbons discharged from the engine, so that it becomes difficult to determine, with high precision, the amount of unburned hydrocarbons adsorbed to the HC adsorbent.

Furthermore, if an emission control catalyst device is provided in a portion of the exhaust passage upstream of the HC adsorbent, portions of unburned hydrocarbons present in exhaust gas temporarily adsorb or adhere to the emission control catalyst device. Therefore, the amount of unburned hydrocarbons temporarily adsorbed or adhered as described above also need to be taken into account, in order to accurately estimate an amount of unburned hydrocarbons adsorbed to the HC adsorbent.

Still further, the amount of unburned hydrocarbons adsorbed to the HC adsorbent changes in accordance with degrees of performance deterioration of the emission control catalyst device. Therefore, it is necessary to consider the performance deterioration of the emission control catalyst device as well.

SUMMARY OF THE INVENTION

Accordingly, it is an object of the invention to provide a technology that is capable of accurately detecting the amount of unburned fuel components adsorbed to an adsorbent in an internal combustion engine equipped with the adsorbent, which adsorbs unburned fuel components.

To achieve the above and/or other objects, an apparatus according to one aspect of the invention determines amount of an unburned fuel component adhered to an adsorbent in an internal combustion engine. The apparatus includes an adsorbent that is provided in an exhaust passage of the internal combustion engine and that adsorbs an unburned fuel component from exhaust gas, and a controller. The controller determines an amount of a fuel component adhered in a passage that is located upstream of the adsorbent and that conducts the fuel component. The controller determines the amount of the fuel component adsorbed to the adsorbent while taking into consideration the determined amount of adhered fuel component.

The thus-determined amount of the fuel component adsorbed assumes a value that is determined considering the amount of fuel components adhered to wall surfaces and the like of passages extending from a location where the fuel injection valve is disposed to a location where the adsorbent is disposed. Therefore, the error between the determined amount of fuel components adsorbed and the actual amount of unburned fuel components adsorbed to the adsorbent becomes small.

According to one embodiment, the controller determines an amount of supplied fuel component that was not consumed during combustion by determining the difference between the amount of fuel component supplied and the amount of fuel component actually consumed during combustion. The controller then determines an amount of fuel component adhered upstream of the combustion chamber, and subtracts that value from the determined amount of supplied fuel component that was not consumed, in order to determine an amount of (unburned) fuel component discharged from the engine. The amount of fuel component adsorbed to the adsorbent is then determined based on the determined amount of discharged fuel component and, when a catalyst device is located between the engine and the adsorbent, an amount of the discharged fuel component that is adhered to (e.g., adsorbed by) the catalyst device.

Another aspect of the invention involves the method of determining the amount of fuel component adsorbed by the adsorbent located in the exhaust passage of an internal combustion engine.

BRIEF DESCRIPTION OF THE DRAWINGS

The foregoing and further objects, features and advantages of the present invention will become apparent from the following description of a preferred embodiment with reference to the accompanying drawings, in which like numerals are used to represent like elements and wherein.

DETAILED DESCRIPTION OF PREFERRED EMBODIMENTS

A preferred embodiment of an apparatus of the invention for calculating an amount of unburned fuel components adsorbed to an adsorbent provided in an internal combustion engine system for adsorbing such unburned fuel components is now described.

Figure 1:
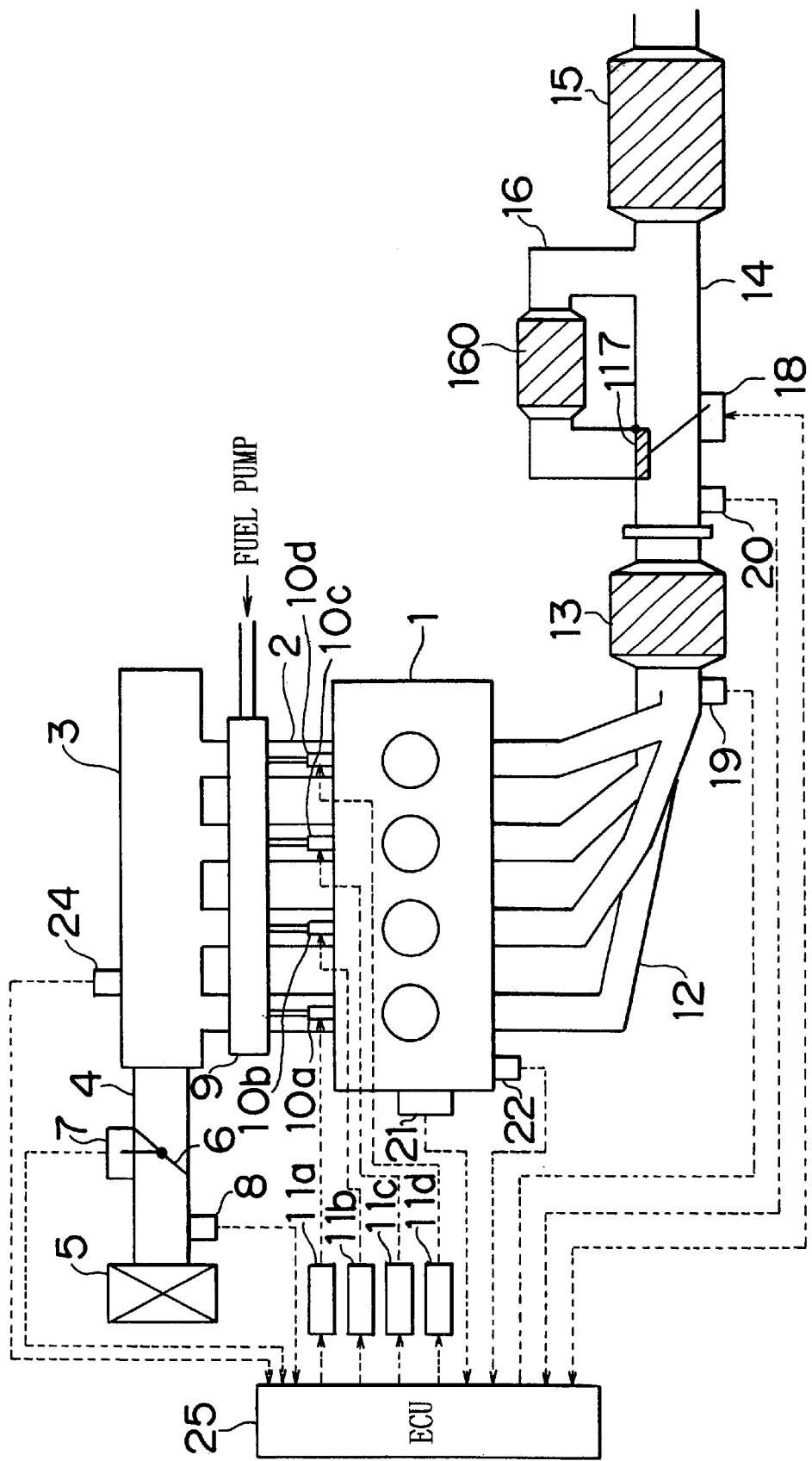
FIG. 1 is a schematic illustration of a construction of an internal combustion engine to which the adsorption amount calculating apparatus of the invention is applied.

FIG. 1 is a schematic illustration of a construction of an internal combustion engine to which the adsorption amount calculating apparatus of the invention is applied.

An internal combustion engine 1 shown in FIG. 1 is a water-cooled 4-stroke gasoline engine having a plurality of cylinders.

An intake manifold 2 is connected to the internal combustion engine 1. Branch pipes of the intake manifold 2 communicate with combustion chambers of corresponding cylinders via intake ports (not shown). The intake manifold 2 is connected to a surge tank 3. The surge tank 3 is connected to an air cleaner box 5 via an intake pipe 4.

The intake pipe 4 is provided with a throttle valve 6 that cooperates with an accelerator pedal (not shown) to adjust the flow of intake air passing through the intake pipe 4. The throttle valve 6 has a throttle position sensor 7 that outputs an electric signal in accordance with the opening of the throttle valve 6.

The intake pipe 4 is also provided with an air flow meter 8 that outputs an electric signal corresponding to the mass of intake air flowing through the intake pipe 4. The surge tank 3 is provided with a vacuum sensor 24 that outputs an electric signal in accordance with the pressure inside the surge tank 3.

The branch pipes of the intake manifold 2 are provided with fuel injection valves 10a, 10b, 10c, 10d (hereinafter, collectively referred to as "fuel injection valves 10"), respectively. The fuel injection valves 10 are connected to a fuel distributor pipe 9. The fuel distributor pipe 9 distributes fuel pumped from a fuel pump (not shown) to the individual fuel injection valves 10.

The fuel injection valves 10 are provided with drive circuits 11a, 11b, 11c, 11d (hereinafter, collectively referred to as "drive circuits 11"), respectively. When a drive circuit 11 applies a drive current to a corresponding fuel injection valve 10, the fuel injection valve 10 opens to inject fuel supplied from the fuel distributor pipe 9 into the input port of a corresponding cylinder.

An exhaust manifold 12 is connected to the internal combustion engine 1. Branch pipes of the exhaust manifold 12 communicate with the combustion chambers of the cylinders via exhaust ports (not shown). A first emission control catalyst device 13 having a small capacity is connected to the exhaust manifold 12 in order to improve the quick activation performance at the time of cold engine start.

The first emission control catalyst device 13 is connected to an exhaust pipe 14. The exhaust pipe 14 is connected at its downstream end to a muffler (not shown). A second emission control catalyst device 15 having a greater capacity than the first emission control catalyst device 13 is provided in a pathway of the exhaust pipe 14.

The first emission control catalyst device 13 and the second emission control catalyst device 15 are three-way catalyst devices, each of which has a ceramic support that is formed from, for example, cordierite into a grating configuration having a plurality of through-holes extending in the flowing direction of exhaust gas, and a catalyst layer coated on a surface of the ceramic support. The catalyst layer of each catalyst device is formed by, for example, loading a surface of a porous alumina ($Al_2O_3$) material having many pores, with platinum-rhodium (Pt—Rh)-based precious metal catalysts.

The first and second emission control catalyst devices 13, 15 each activate when the catalyst bed temperature thereof is equal to or higher than a predetermined temperature. If the air-fuel ratio of exhaust gas flowing into a catalyst device is close to the theoretical air-fuel ratio, the catalyst device causes hydrocarbons (HC) and carbon monoxide (CO) contained in exhaust gas to react with oxygen ($O_2$) present in exhaust gas, thereby oxidizing them into water ($H_2O$) and carbon dioxide ($CO_2$). Simultaneously, the three-way catalyst device causes oxides of nitrogen (NOx) present in exhaust gas to react with hydrocarbons (HC) and carbon monoxide (CO) present in exhaust gas, thereby reducing NOx into water ($H_2O$), carbon dioxide ($CO_2$) and nitrogen ($N_2$).

A bypass passage 16 bypassing a portion of the exhaust pipe 14 is connected to a portion of the exhaust pipe 14 located upstream of the second emission control catalyst device 15. Provided in the pathway of the bypass passage 16 is an HC adsorbent 160 that is formed mainly from, for example, zeolite. The HC adsorbent 160 adsorbs unburned hydrocarbons present in exhaust gas when the temperature of the HC adsorbent 160 is lower than a predetermined temperature. When the predetermined temperature is reached or exceeded, the HC adsorbent 160 releases (desorbs) unburned hydrocarbons previously adsorbed.

An open-close valve 17 capable of completely closing one of the bypass passage 16 and the exhaust pipe 14 is provided at a connecting site between the exhaust pipe 14 and an upstream end of the bypass passage 16. The open-close valve 17 is provided with an actuator 18 that is formed by a step motor or the like so as to open and close the open-close valve 17 in accordance with the magnitude of a current applied thereto.

Normally, the actuator 18 drives the open-close valve 17 so as to completely close the bypass passage 16 and fully open the exhaust pipe 14 as shown in FIG. 1. In this situation, the entire amount of exhaust gas from the first emission control catalyst device 13 passes through the exhaust pipe 14 before flowing into the second emission control catalyst device 15.

Figure 2:
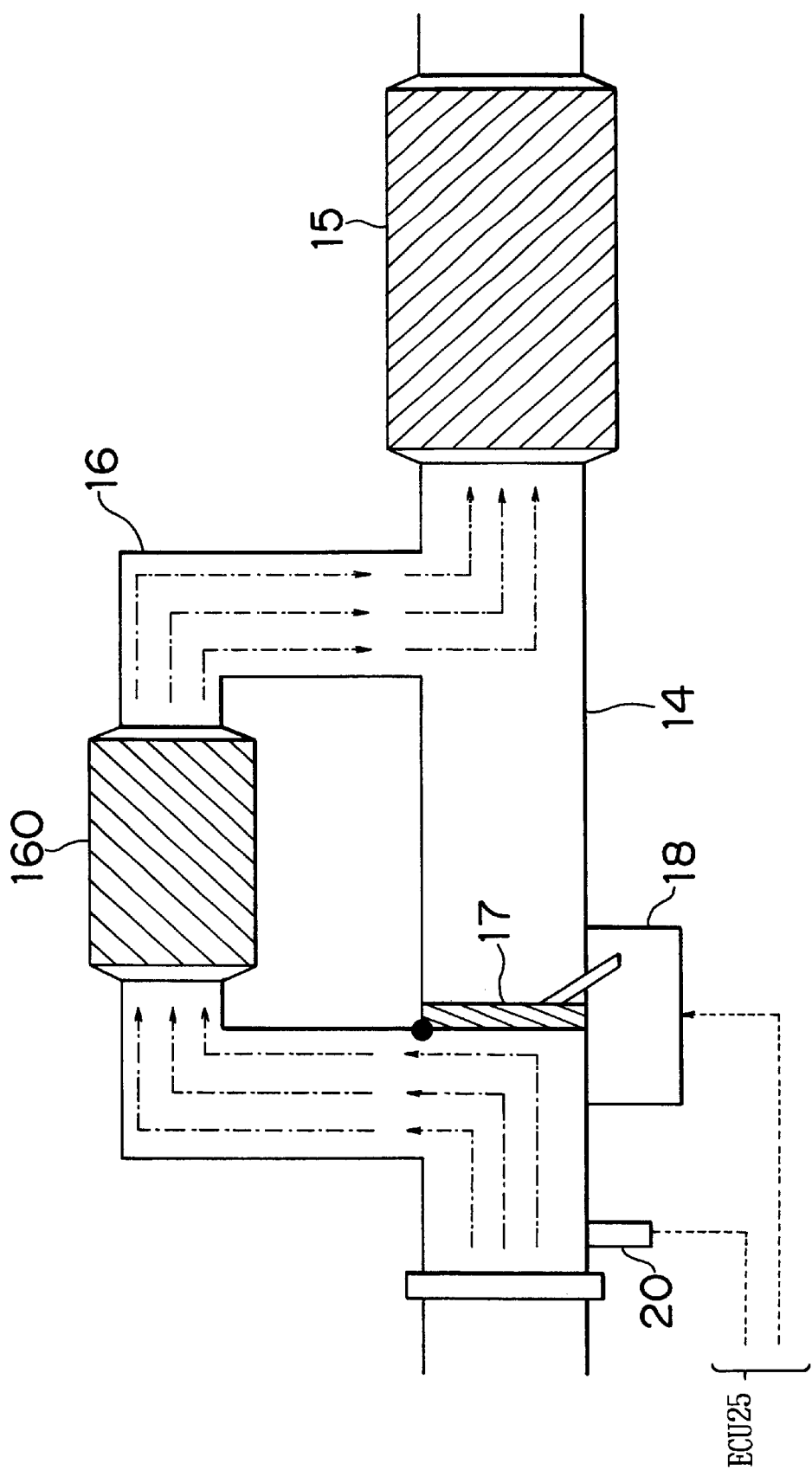
FIG. 2 illustrates an operation of an open-close valve.

When the catalyst bed temperature of the second emission control catalyst device 15 is lower than a predetermined activation temperature, for example, at the time of a cold start of the internal combustion engine 1, the actuator 18 drives the open-close valve 17 so as to completely close the exhaust pipe 14 and fully open the bypass passage 16 as shown in FIG. 2. In this situation, the entire amount of exhaust gas from the first emission control catalyst device 13 passes through the bypass passage 16 and, therefore, the HC adsorbent 160 before flowing into the second emission control catalyst device 15, so that unburned hydrocarbons present in exhaust gas are adsorbed to the HC adsorbent 160. Therefore, unburned hydrocarbons in exhaust gas will not be released into the atmosphere even if the second emission control catalyst device 15 is not activated.

Figure 3:
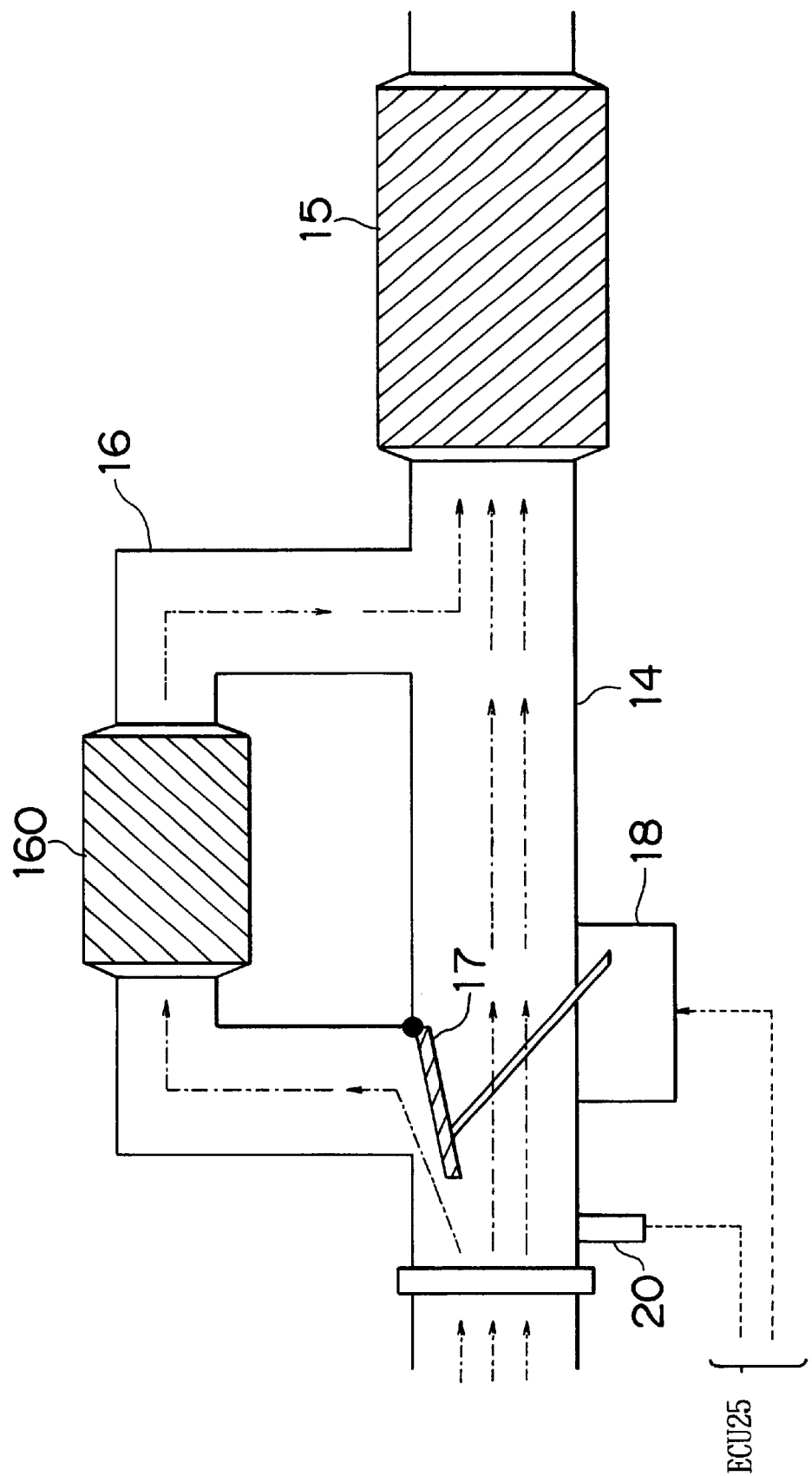
FIG. 3 illustrates another operation of the open-close valve.

After the catalyst bed temperature of the second emission control catalyst device 15 has reached or exceeded the activation temperature, the actuator 18 drives the open-close valve 17 so that both the bypass passage 16 and the exhaust pipe 14 become conductive as shown in FIG. 3. In this case, the open-close valve 17 is set to such an opening that the ratio of the flow through the bypass passage 16 to the flow through the exhaust passage 14 becomes small, that is, such an opening that the opening of the open-close valve 17 to the bypass passage 16 becomes smaller than the opening thereof to the exhaust passage 14.

In this situation, a major portion of exhaust gas from the first emission control catalyst device 13 flows into the second emission control catalyst device 15 via the exhaust pipe 14, and the small remaining portion flows into the second emission control catalyst device 15 via the bypass passage 16 and the HC adsorbent 160. Therefore, heat transfers from the exhaust gas that is flowing through the bypass passage 16 to the HC adsorbent 160, thereby increasing the temperature of the HC adsorbent 160.

When, due to heat from the exhaust gas, the HC adsorbent 160 is heated to or above a predetermined temperature, previously adsorbed unburned hydrocarbons are desorbed from the HC adsorbent 160 and flow into the second emission control catalyst device 15 together with the exhaust gas. As a result, the unburned hydrocarbons oxidize through reactions with $O_2$ contained in the exhaust gas or $O_2$ stored in the second emission control catalyst device 15 due to its oxygen storing capacity (OSC).

Simultaneously, the unburned hydrocarbons desorbed from the HC adsorbent 160 are consumed as reducers for reducing NOx present in exhaust gas.

After the unburned hydrocarbons adsorbed to the HC adsorbent 160 have been desorbed, that is, after the HC adsorbent 160 has been renewed, the actuator 18 drives the open-close valve 17 so as to completely close the bypass passage 16 and fully open the exhaust pipe 14.

An air-fuel ratio sensor 19 that outputs an electric signal corresponding to the air-fuel ratio of exhaust gas flowing into the first emission control catalyst device 13 is provided in the exhaust manifold 12, more preferably, in a portion of the exhaust manifold 12 located immediately upstream of the first emission control catalyst device 13.

The air-fuel ratio sensor 19 is substantially made up of, for example, a solid electrolyte portion formed from zirconia (ZrO$_2$) into a tubular shape by firing, an outside platinum electrode covering an outside surface of the solid electrolyte portion, and an inside platinum electrode covering an inside surface of the solid electrolyte portion. The air-fuel ratio sensor 19 outputs a current proportional to the oxygen concentration in exhaust gas (the concentration of unburned hydrocarbons if the air-fuel ratio is in the rich side of the theoretical air-fuel ratio) as oxygen ions migrate upon application of a voltage between the outside electrode and the inside electrode.

An oxygen sensor (O$_2$ sensor) 20 that outputs an electric signal corresponding to the oxygen concentration in exhaust gas flowing out of the first emission control catalyst device 13 is provided in a portion of the exhaust pipe 14 located upstream of the bypass passage 16, more preferably, a portion of the exhaust pipe 14 located immediately downstream of the first emission control catalyst device 13.

The internal combustion engine 1 is provided with a crank position sensor 21 that outputs a pulse signal at every predetermined rotational angle (for example, 30°) of a crankshaft (not shown), and a water temperature sensor 22 that outputs an electric signal corresponding to the temperature of cooling water flowing in a water jacket (not shown) of the internal combustion engine 1.

Figure 4:
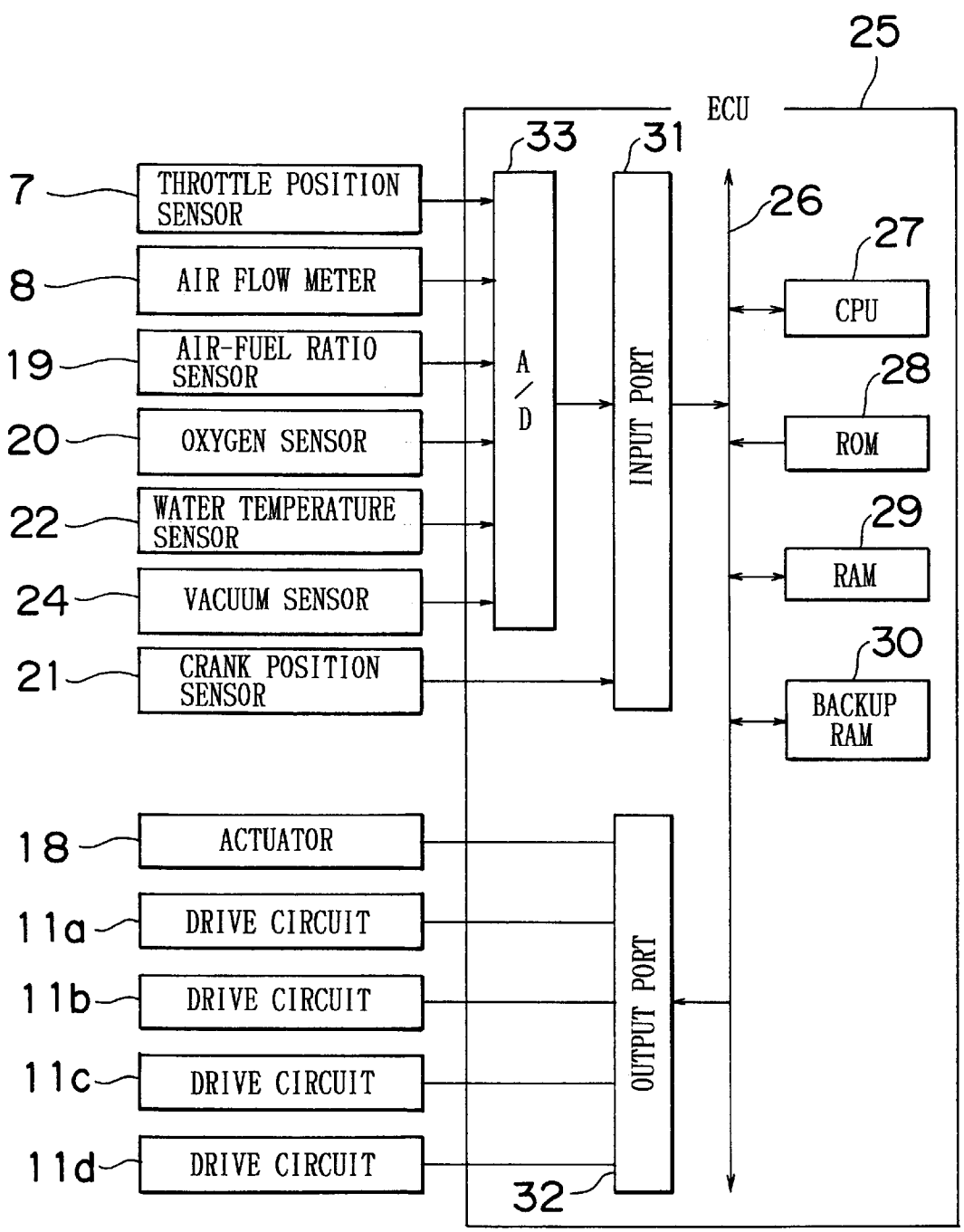
FIG. 4 is a block diagram illustrating an internal construction of an ECU.

The crank position sensor 21, the water temperature sensor 22, the throttle position sensor 7, the air flow meter 8, the vacuum sensor 24, the air-fuel ratio sensor 19 and the oxygen sensor 20 are connected to an engine-controlling electronic control unit (ECU) 25 by their respective wirings so that the signal from each sensor is input to the ECU 25, as indicated in FIG. 4.

Using the output signals of the sensors, the ECU 25 determines an operating condition of the internal combustion engine 1. In accordance with the determined operating condition, the ECU 25 performs various controls such as the fuel injection control, the ignition control, the open-close control of the open-close valve 17, and the like.

As indicated in FIG. 4, the ECU 25 has a CPU 27, a ROM 28, a RAM 29, a backup RAM 30, an input port 31, and an output port 32 that are interconnected by a bi-directional bus 26. The ECU 25 further has an A/D converter 33 that is connected to the input port 31.

The input port 31 receives output signals of the crank position sensor 21 and the like, and sends the signals to the CPU 27 and to the RAM 29. The input port 31 also receives output signals of the throttle position sensor 7, the air flow meter 8, the air-fuel ratio sensor 19, the oxygen sensor 20, the water temperature sensor 22, the vacuum sensor 24 and the like, via the A/D converter 33, and sends the signals to the CPU 27 and to the RAM 29.

The output port 32 sends control signals from the CPU 27 to the actuator 18 and to the drive circuits 11.

The ROM 28 stores application programs of, for example, a fuel injection amount control routine for determining an amount of fuel to be injected from each fuel injection valve 10, an air-fuel ratio feedback control routine for executing the air-fuel ratio feedback control of the fuel injection amount, a fuel injection timing control routine for determining a fuel injection timing of each fuel injection valve 10, a passage switch control routine for controlling the open-close valve 17, and the like. The ROM 28 also stores various control maps.

The control maps include, for example, a fuel injection amount control map indicating a relationship between the fuel injection amount and the operating condition of the internal combustion engine 1, a fuel injection timing control map indicating a relationship between the fuel injection timing and the operating condition of the internal combustion engine 1, an activation determination control map indicating a relationship between the temperature of cooling water at the time of start of the internal combustion engine and the amount of time needed between the start of the engine and the activation of the second three-way catalyst device 15 (hereinafter, referred to as "catalytic activation time"), and the like.

The RAM 29 stores output signals of the various sensors, results of operations of the CPU 27, and the like. The results of operations include, for example, an engine revolution speed calculated from the output signal of the crank position sensor 21, and the like. The output signals of the various sensors, the results of operations of the CPU 27, and the like are rewritten as the latest data every time the crank position sensor 21 outputs a signal.

The backup RAM 30 is a non-volatile memory capable of retaining data even after the internal combustion engine 1 is stopped. In this embodiment, the backup RAM 30 stores data indicating the degree of deterioration of the first emission control catalyst device 13.

The CPU 27 operates in accordance with the application programs stored in the ROM 28, and determines an operating condition of the internal combustion engine 1 on the basis of the output signals of the sensors stored in the RAM 29. Based on the determined operating condition of the internal combustion engine 1 and the various control maps, the CPU 27 calculates a fuel injection amount, a fuel injection timing, an opening or closing timing of the open-close valve 17, and the like. Based on the fuel injection amount, the fuel injection timing, the opening or closing timing of the open-close valve 17, and the like, the CPU 27 controls the drive circuits 11 and the actuator 18.

To perform, for example, the fuel injection control, the CPU 27 follows the fuel injection amount control routine, and determines a fuel injection amount (TAU) by the following equation:

$$TAU = TP \times FWL \times (FAF+FG) \times [FASE+FAE+FOTP+FDE(D)] \times FFC + TAUV \quad (1)$$

where:
TP: basic injection amount
FWL: warm-up increase
FAF: air-fuel ratio feedback correction factor
FG: air-fuel ratio learned factor
FASE: post-start increase
FAE: acceleration increase
FOTP: OTP increase
FDE(D): deceleration increase (decrease)
FFC: correction factor at the time of fuel cut return
TAUV: invalid fuel injection duration In the foregoing equation, factors TP, FWL, FASE, FAE, FOTP, FDE(D), FFC, TAUV and the like are calculated on the basis of the fuel injection amount control map stored in the ROM 28.

The air-fuel ratio feedback correction factor FAF is set to 1.0 when an air-fuel ratio feedback control condition is not met. When the air-fuel ratio feedback control condition is met, the air-fuel ratio feedback correction factor FAF is set to such a value that the air-fuel ratio of exhaust gas flowing into the first emission control catalyst device 13 (i.e., the value of the output signal of the air-fuel ratio sensor 19) and/or the air-fuel ratio of exhaust gas flowing into the second emission control catalyst device 15 (i.e., the value of the output signal of the oxygen sensor 20) becomes equal to a target air-fuel ratio that is set in accordance with the oxygen storing capacity of the first emission control catalyst device 13 or the second emission control catalyst device 15.

Examples of the aforementioned air-fuel ratio feedback control condition include a condition in which the cooling water temperature is equal to or higher than a predetermined temperature, a condition in which the internal combustion engine 1 is not started, a condition in which the increasing correction of the fuel injection amount after start of the engine is not performed, a condition in which the warm-up increasing correction of the fuel injection amount is not performed, a condition in which the acceleration increasing correction of the fuel injection amount is not performed, a condition in which the OTP increasing correction for preventing overheating of exhaust-system component parts, such as the first emission control catalyst device 13, the second emission control catalyst device 15, the air-fuel ratio sensor 19, the oxygen sensor 20 and the like, is not performed, a condition in which the fuel cut control is not performed, and the like.

When the air-fuel ratio feedback control condition as mentioned above is met, the CPU 27 inputs (i.e., receives) the value of the output signal of the air-fuel ratio sensor 19 or the oxygen sensor 20 via the A/D converter 33. Based on the input value of the signal and a response delay time of the air-fuel ratio sensor 19 or of the oxygen sensor 20, the CPU 27 determines whether the actual exhaust air-fuel ratio is in the lean side or the rich side of the target air-fuel ratio.

When the CPU 27 determines that the actual exhaust air-fuel ratio is in the rich side of the target air-fuel ratio, the CPU 27 determines a value of the air-fuel ratio feedback correction factor FAF to decrease the fuel injection amount TAU.

When it is determined that the actual exhaust air-fuel ratio is in the lean side of the target air-fuel ratio, the CPU 27 determines a value of the air-fuel ratio feedback correction factor FAF to increase the fuel injection amount TAU.

The air-fuel ratio feedback correction factor FAF determined in the above-described procedure is subjected to upper and lower guard processing, and then substituted in the equation (1), that is, the fuel injection amount determining equation.

Subsequently, in order to control the open-close valve 17, the CPU 27 inputs the output signal of the water temperature sensor 22 at the time of a start of the internal combustion engine 1, and calculates a catalytic activation time of the second emission control catalyst device 15 based on the input signal value and the activation determination control map stored in the ROM 28.

During a period between the start of the internal combustion engine 1 and the elapse of the catalytic activation time, that is, a period during which the second emission control catalyst device 15 is in a not-activated state, the CPU 27 outputs a control signal to the actuator 18 so as to keep the exhaust pipe 14 completely closed and keep the bypass passage 16 fully open. In this situation, the entire amount of exhaust gas discharged from the internal combustion engine 1 flows into the second emission control catalyst device 15 after passing through the bypass passage 16 and the HC adsorbent 160, not through the exhaust pipe 14. Therefore, unburned hydrocarbons contained in exhaust gas are not released into the atmosphere but are adsorbed to the HC adsorbent 160.

When the catalytic activation time elapses, that is, when the second emission control catalyst device 15 activates, the CPU 27 executes the renewing process for the HC adsorbent 160. Specifically, the CPU 27 sends a control signal to the actuator 18 so that both the exhaust pipe 14 and the bypass passage 16 become conductive, as described above with reference to FIG. 3. In this situation, the opening of the open-close valve 17 is set so as to achieve a small ratio of the flow through the bypass passage 16 to the flow through the exhaust pipe 14. Therefore, a major portion of exhaust gas from the internal combustion engine 1 flows into the second emission control catalyst device 15 via the exhaust pipe 14, and the small remaining portion flows into the second emission control catalyst device 15 via the bypass passage 16 and the HC adsorbent 160.

Therefore, the HC adsorbent 160 is heated by heat transferred from the exhaust gas flowing therethrough. When the temperature of the HC adsorbent 160 rises to a temperature range of desorption of unburned hydrocarbons, previously adsorbed unburned hydrocarbons are desorbed from the HC adsorbent 160 and flow into the second emission control catalyst device 15 together with exhaust gas.

When unburned hydrocarbons desorbed from the HC adsorbent 160 flow into the second emission control catalyst device 15 together with exhaust gas, the exhaust air-fuel ratio at the second emission control catalyst device 15 shifts to the rich side. In this situation, the CPU 27 corrects the air-fuel ratio of exhaust gas discharged from the internal combustion engine 1 to the lean side through the air-fuel ratio feedback control so as to conform the air-fuel ratio of exhaust gas flowing into the second emission control catalyst device 15 to the target air-fuel ratio. As a result, unburned hydrocarbons desorbed from the HC adsorbent 160 together with harmful components of exhaust gas from the internal combustion engine 1, are lessened or substantially removed in the second emission control catalyst device 15.

The CPU 27 determines an amount of unburned hydrocarbons adsorbed to the HC adsorbent 160. Based on the determined amount of unburned hydrocarbons, the CPU 27 sets a renewing process time for the HC adsorbent 160. When the elapsed time from the start of execution of the renewing process of the HC adsorbent 160 reaches the set renewing process time, the CPU 27 considers the desorption of unburned hydrocarbons from the HC adsorbent 160 to be completed (the renewing process of the HC adsorbent 160 has been completed), and then controls the actuator 18 so as to completely close the bypass passage 16 and fully open the exhaust pipe 14.

A method for determining an amount of unburned hydrocarbons adsorbed to the HC adsorbent 160 will now be described.

To determine an amount of unburned hydrocarbons adsorbed to the HC adsorbent 160, the CPU 27 first calculates an amount $F_{OUT}$ of unburned hydrocarbons discharged from the internal combustion engine 1 (engine-discharged hydrocarbon amount) during a period between a start of the internal combustion engine 1 and the end of the operation of causing unburned hydrocarbons to adsorb to the HC adsorbent 160 (following the elapse of the catalytic activation time).

An example of the method of calculating the amount $F_{OUT}$ of unburned hydrocarbons discharged from the engine will be described below.

The CPU 27 first calculates a sum $F_{SUM}$ of fuel injected from the fuel injection valves 10 during the period between the start of the internal combustion engine 1 and the end of the operation of causing unburned hydrocarbons to adsorb to the HC adsorbent 160. The CPU 27 also calculates a sum of $GA_{SUM}$ of air taken into the internal combustion engine 1 during the same period (used to calculate $F_{SUM}$), and an amount of unburned hydrocarbons adhered to wall surfaces of passages extending from the fuel injection valves 10 to the combustion chambers during the period, that is, a sum of wet fuel $FW_{SUM}$ during the period.

Subsequently, the CPU 27 calculates an amount of fuel corresponding to the sum of intake air $GA_{SUM}$ on the presumption that the internal combustion engine 1 performed combustion at the theoretical air-fuel ratio (for example, 14.6), that is, an amount of fuel reckoned to have been consumed for actual combustion in the internal combustion engine 1 ($GA_{SUM}/14.6$).

The CPU 27 subtracts the amount of fuel consumed for actual combustion ($GA_{SUM}/14.6$) and the sum of wet fuel $FW_{SUM}$ from the sum of injected fuel $F_{SUM}$, and regards the resultant value as an engine-discharged hydrocarbon amount $F_{OUT}(=F_{SUM}-GA_{SUM}/14.6-FW_{SUM})$.

The sum of wet fuel $FW_{SUM}$ can be calculated by using equation (2):

$$FW_{SUM}=\Sigma M_f=\Sigma(X\times F_{inj}-Y\times M_{f-1}) \qquad (2)$$

where: $F_{inj}$ is the amount of fuel injected from a fuel injection valve 10 by each fuel injection operation; Mf is the amount of fuel that adheres to the wall surfaces of a passage extending from the fuel injection valve 10 to the combustion chamber during each fuel injection operation; X is the rate of fuel adherence to the wall surfaces of the passage extending from the fuel injection valve 10 to the combustion chamber (fuel adherence rate); and Y is the rate of evaporation or release of fuel from the wall surfaces of the passage extending from the fuel injection valve 10 to the combustion chamber (fuel evaporation rate).

The fuel adherence rate X and the fuel evaporation rate Y vary depending on the surface temperatures of the intake ports, the intake valves, the combustion chambers and the like, and the intake flow rate, and the like. Therefore, it is also possible to use the cooling water temperature THW, the engine revolution speed NE, the pressure inside the surge tank 3 (intake pipe pressure) PM, which have correlations with the surface temperatures and the intake flow rate, as parameters for this calculation. For this manner of calculation, it is also possible to prepare beforehand a fuel adherence rate control map indicating relationships between the fuel adherence rate X and the cooling water temperature THW, the engine revolution speed NE and the intake pipe pressure PM, and a fuel evaporation rate control map indicating relationships between the fuel evaporation rate Y and the cooling water temperature THW, the engine revolution speed NE and the intake pipe pressure PM on the basis of experiments. In that case, the CPU 27 uses those maps to determine a fuel adherence rate X and a fuel evaporation rate Y that are specified by the value of an output signal of the water temperature sensor 22 (cooling water temperature THW), the engine revolution speed NE calculated from the value of an output signal of the crank position sensor 21, and the value of an output signal of the vacuum sensor 24 (intake pipe pressure PM).

Subsequently, on the basis of the engine-discharged unburned hydrocarbon amount $F_{OUT}$, the CPU 27 calculates an amount of unburned hydrocarbons passing through the first emission control catalyst device 13, that is, an amount of unburned hydrocarbons reaching the HC adsorbent 160. The CPU 27 calculates an amount of unburned hydrocarbons passing through the first emission control catalyst device 13 by using a catalyst-passing rate K of the first emission control catalyst device 13 determined in accordance with the degree of deterioration of the first emission control catalyst device 13.

Figure 5:
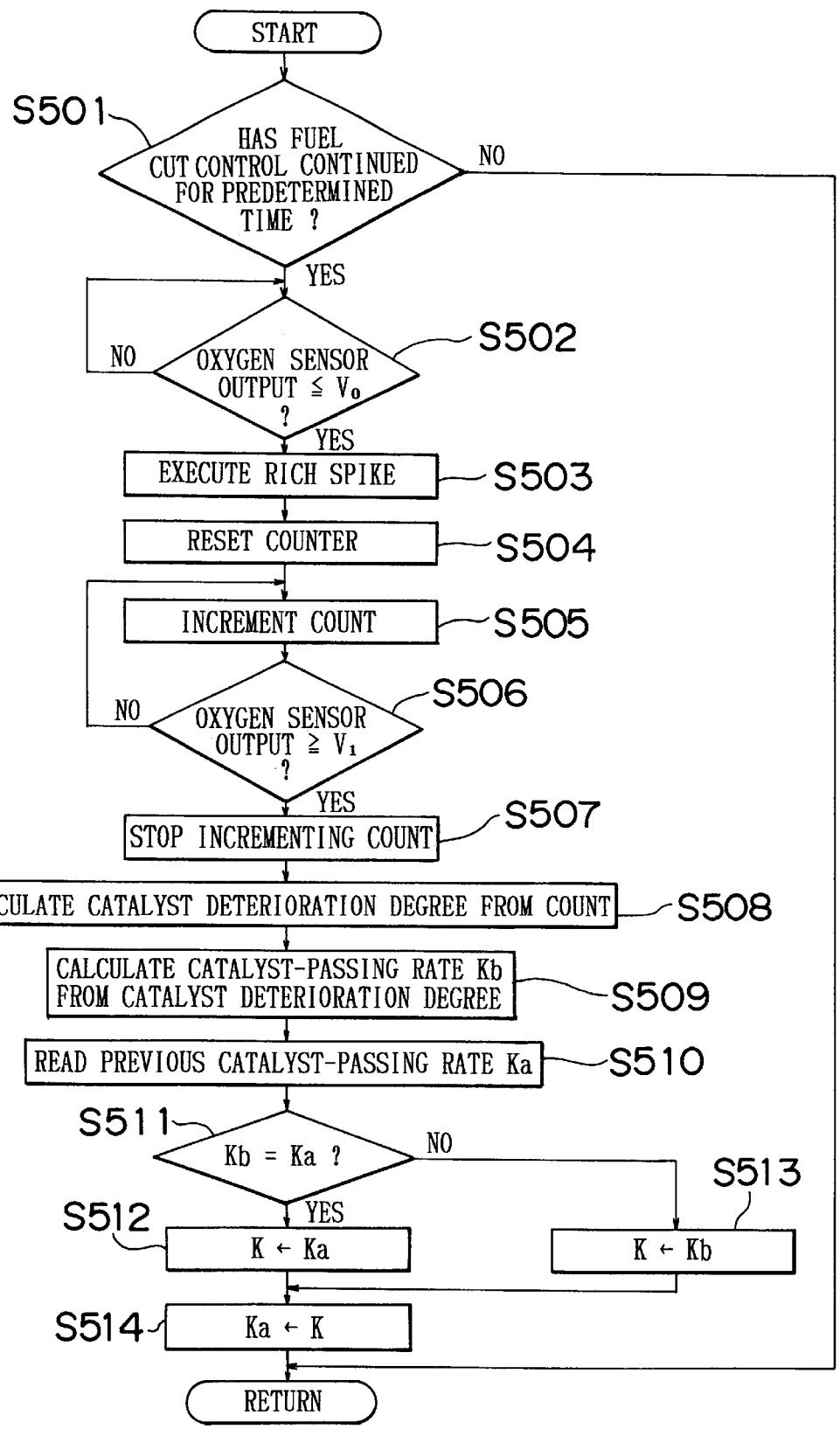
FIG. 5 is a flowchart illustrating a catalyst-passing rate determining routine.

The catalyst-passing rate K is determined at a timing different from a timing of determining an amount of unburned hydrocarbons adsorbed to the HC adsorbent 160. The catalyst-passing rate K is stored in a predetermined area in the RAM 29. More specifically, the catalyst-passing rate K is determined in a catalyst-passing rate determining routine as illustrated in FIG. 5. The catalyst-passing rate determining routine is pre-stored in the ROM 28. The routine is repeatedly executed at every predetermined time (for example, every time the crank position sensor 21 outputs a pulse signal) after the warming-up of the internal combustion engine 1 has been completed.

In the catalyst-passing rate determining routine, the CPU 27 first determines in step S501 whether execution of the fuel-cut control of the internal combustion engine 1 has continued for at least a predetermined length of time. If the determination in step S501 is negative, the execution of this routine temporarily ends. If the determination in step 501 is affirmative, the process proceeds to step S502.

In step S502, the CPU 27 determines whether the value of the output signal of the oxygen sensor 20 provided in a portion of the exhaust pipe 14 downstream of the first emission control catalyst device 13 has decreased to or below a predetermined voltage $V_0$ (e.g., 0.2 V), that is, whether the air-fuel ratio of exhaust gas downstream of the first emission control catalyst device 13 has reached a predetermined lean air-fuel ratio. If the determination in step S502 is negative, the CPU 27 repeats the processing of step S502 until the value of the output signal of the oxygen sensor 20 decreases to or below the predetermined voltage $V_0$. When the determination in step S502 is affirmative, the CPU 27 proceeds to step S503.

In step S503, the CPU 27 executes a generally termed rich spike control, that is, controls the fuel injection amount so as to achieve a rich air-fuel ratio of exhaust gas discharged from the internal combustion engine 1. Subsequently in step S504, the CPU 27 resets the count of a counter that measures an elapsed time following the start of execution of the rich spike control. In step S505, the CPU 27 increments the count of the counter. Subsequently in step S506, the CPU 27 determines whether the value of the output signal of the oxygen sensor 20 is equal to or greater than a predetermined voltage $V_1$ (e.g., 0.5 V), that is, whether the air-fuel ratio of exhaust gas downstream of the first emission control catalyst device 13 has reached a predetermined rich air-fuel ratio. If the determination in step S506 is negative, the CPU 27 repeats the processing of S505 and S506 until the value of the output signal of the oxygen sensor 20 becomes equal to or greater than the predetermined voltage $V_1$. When the determination in step S506 is affirmative, the process proceeds to step S507, in which the CPU 27 stops incrementing the count of the counter.

Subsequently in step S508, the CPU 27 determines a degree of performance deterioration of the first emission control catalyst device 13 based on the count of the counter. Due to the oxygen storing capacity (OSC) of the first emission control catalyst device 13, the first emission control catalyst device 13 stores oxygen from exhaust gas when exhaust gas flowing into the first emission control catalyst device 13 is brought to an oxygen-rich state by the fuel cut control. Subsequently, upon execution of the rich spike control, the air-fuel ratio of exhaust gas flowing into the first emission control catalyst device 13 becomes a rich ratio. However, the air-fuel ratio of exhaust gas downstream of the first emission control catalyst device 13 (that is, the value of the output signal of the oxygen sensor 20) does not immediately become a rich ratio, because oxygen stored in the first emission control catalyst device 13 due to the OSC is released into exhaust gas.

If the performance of the first emission control catalyst device 13 has deteriorated, the OSC of the first emission control catalyst device 13 correspondingly decreases, so that the duration between start of execution of the rich spike and the time point at which the value of the output signal of the oxygen sensor 20 reaches a value that indicates a rich air-fuel ratio (hereinafter, referred to as "rich output time") becomes shorter. Therefore, a degree of deterioration of the first emission control catalyst device 13 can be determined by using the rich output time as a parameter.

Figure 6:
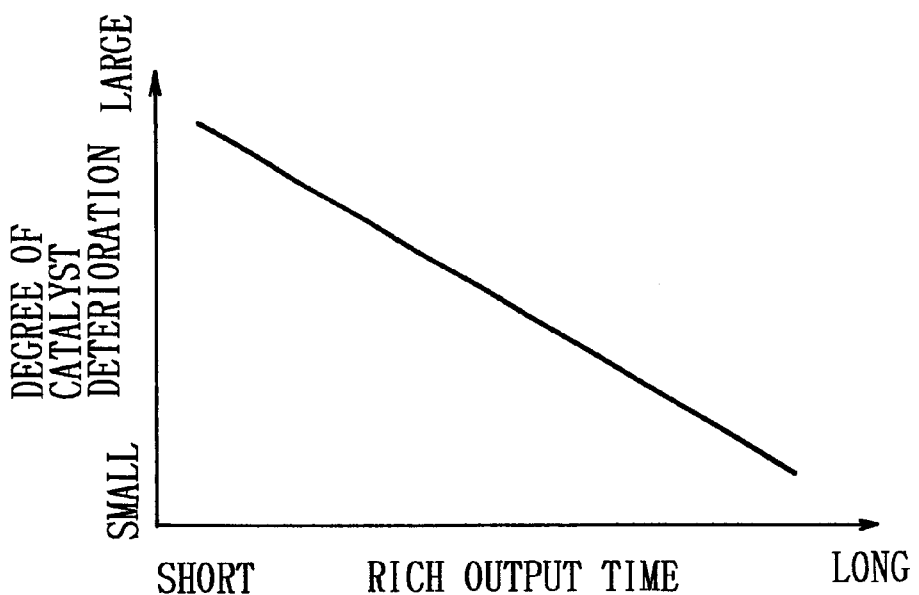
FIG. 6 is a catalyst deterioration determination control graph.

In this embodiment, therefore, a map indicating a relationship between the degree of deterioration of the first emission control catalyst device 13 and the rich output time (hereinafter, referred to as "catalyst deterioration determination control map") as indicated in FIG. 6 is prepared beforehand on the basis of experiments. Based on the catalyst deterioration determination control map and the count of the aforementioned counter, the CPU 27 determines a degree of deterioration of the first emission control catalyst device 13.

In step S509 in FIG. 5, the CPU 27 calculates a catalyst-passing rate Kb of the first emission control catalyst device 13 from the catalyst deterioration degree determined in step S508. If the surface area of the catalyst layer of the first emission control catalyst device 13 decreases due to deterioration of the catalyst device 13, decreases occur in the performance of physically adsorbing unburned hydrocarbons, the low-temperature activating performance, and the catalytic action of the first emission control catalyst device 13. Therefore, the amount of unburned hydrocarbons passing through the first emission control catalyst device 13 increases. Hence, it is possible to specify a catalyst-passing rate Kb by using the degree of deterioration of the first emission control catalyst device 13 as a parameter.

Figure 7:
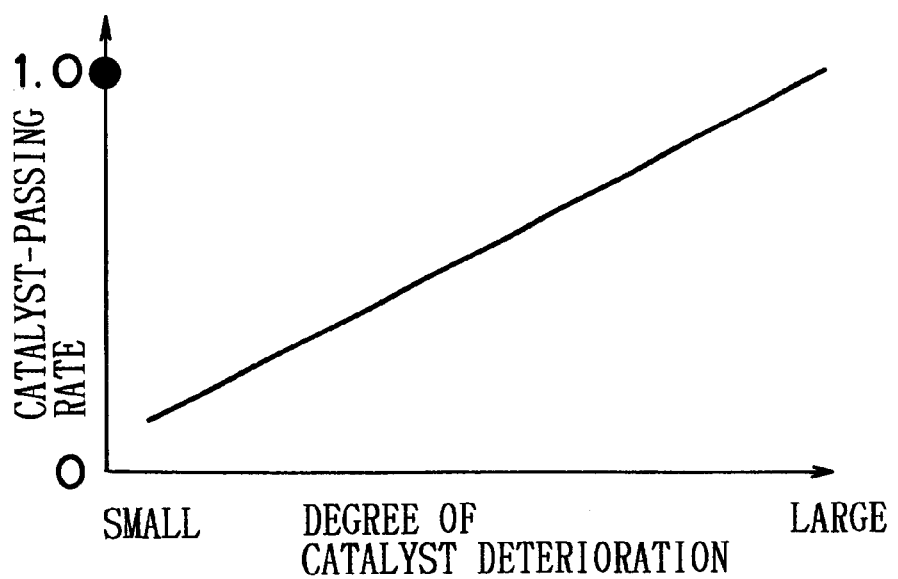
FIG. 7 is a catalyst-passing rate determination control graph.

In this embodiment, therefore, a map indicating a relationship between the passing rate K of the first emission control catalyst device 13 and the degree of catalyst deterioration (hereinafter, referred to as "catalyst-passing rate determination control map") as indicated in FIG. 7 is prepared beforehand on the basis of experiments. Based on the catalyst-passing rate determination control map and the degree of deterioration of the first emission control catalyst device 13, the CPU 27 calculates a passing rate Kb of the first emission control catalyst device 13.

In step S510 in FIG. 5, the CPU 27 reads from a predetermined area in the backup RAM 30 the catalyst-passing rate Ka determined in the previous cycle of the routine. Subsequently in step S511, the CPU 27 determines whether the catalyst-passing rate Kb determined in step S509 equals the previously determined catalyst-passing rate Ka read from the backup RAM 30 in step S510. If the determination in step S511 is affirmative, the CPU 27 regards the previously determined catalyst-passing rate Ka as a final catalyst-passing rate K, and stores it into a predetermined area in the RAM 29 in step S512. If the determination in step S511 is negative, the CPU 27 regards the presently determined catalyst-passing rate Kb as a final catalyst-passing rate K, and stores it into the predetermined area in the RAM 29 in step S513. After executing step S512 or S513, the CPU 27 proceeds to step S514, in which the CPU 27 rewrites the previously determined catalyst-passing rate Ka stored in the predetermined area in the backup RAM 30 into the final catalyst-passing rate K determined in step S512 or S513. Subsequently, the CPU 27 ends the execution of the routine.

Subsequently, the CPU 27 calculates an amount of unburned hydrocarbons adsorbed to the HC adsorbent 160 (adsorbed hydrocarbon amount) $HC_{ad}$ by multiplying the engine-discharged hydrocarbon amount $F_{OUT}$ by the catalyst-passing rate K and the characteristic adsorption performance factor S of the HC adsorbent 160 ($HC_{ad}=F_{OUT} \times K \times S$).

By executing an application program stored in the ROM 28 as described above, the CPU 27 calculates the amount of adsorbed fuel component ($HC_{ad}$) based on the calculated amount of unconsumed fuel components ($F_{SUM}-GA_{SUM}/14.6$), the calculated amount of adhered fuel components upstream of the combustion chamber ($FW_{SUM}$), and the calculated amount of adhered fuel components between the combustion chamber and the adsorbent 160 (using catalyst passing rate K).

The operation and advantages of the embodiment will be described below.

Figure 8:
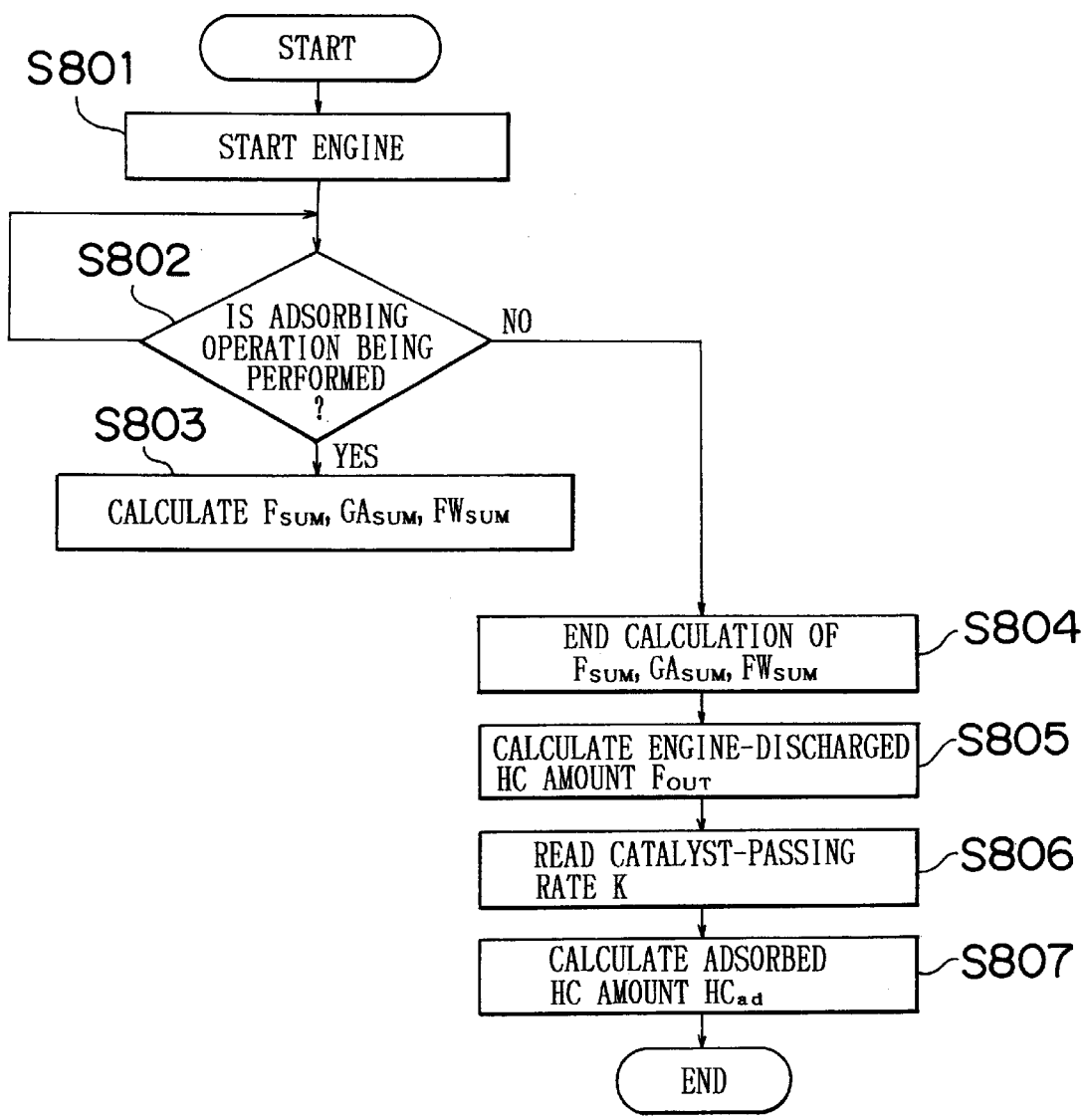
FIG. 8 is a flowchart illustrating an adsorbed hydrocarbon amount determining routine.

The CPU 27 executes an adsorbed HC amount determining routine as illustrated in FIG. 8 when the internal combustion engine 1 is started. The adsorbed HC amount determining routine is pre-stored in the ROM 28.

In the adsorbed HC amount determining routine, the CPU 27 first executes a start control of the internal combustion engine 1 in step S801. Subsequently in step 802, the CPU 27 determines whether the actuator 18 is being controlled so as to cause unburned hydrocarbons to adsorb to the HC adsorbent 160, that is, whether the actuator 18 is being controlled so that the open-close valve 17 fully opens the bypass passage 16 and completely closes the exhaust pipe 14. If it is determined in step S802 that the actuator 18 is being controlled so as to cause unburned hydrocarbons to adsorb to the HC adsorbent 160, the CPU 27 executes the operation of calculating a sum of injected fuel $F_{SUM}$, a sum of intake air $GA_{SUM}$, and a sum of wet fuel $FW_{SUM}$ in step S803.

After executing the processing of step S803, the CPU 27 executes the processing of step S802 again. If it is determined again in step S802 that the actuator 18 is being controlled, the CPU 27 executes the processing of the step S803, and updates the sum of injected fuel $F_{SUM}$, the sum of intake air $GA_{SUM}$, and the sum of wet fuel $FW_{SUM}$. That is, the CPU 27 repeatedly executes the processing of step S803 during a period between the start of the internal combustion engine 1 and the end of the operation of adsorbing hydrocarbons to the HC adsorbent 160, thereby calculating the sum of injected fuel $F_{SUM}$, the sum of intake air $GA_{SUM}$, and the sum of wet fuel $FW_{SUM}$ occurring during that period.

After the operation of adsorbing hydrocarbons to the HC adsorbent 160 ends, the CPU 27 determines in step S802 that the actuator 18 is not being controlled to adsorb unburned hydrocarbons to the HC adsorbent 160 (NO in step S802), and proceeds to step S804. In step S804, the CPU 27 ends the calculation of the sum of injected fuel $F_{SUM}$, the sum of intake air $GA_{SUM}$, and the sum of wet fuel $FW_{SUM}$.

Subsequently in step S805, the CPU 27 calculates an engine-discharged hydrocarbon amount $F_{OUT}$ from the sum of injected fuel $F_{SUM}$, the sum of intake air $GA_{SUM}$, and the sum of wet fuel $FW_{SUM}$ occurring at the end of the calculation in step S804 ($F_{OUT}=F_{SUM}-GA_{SUM}/14.6—FW_{SUM}$). Subsequently in step S806, the CPU 27 reads from the RAM 29 the catalyst-passing rate K calculated in the catalyst-passing rate determining routine as described with reference to FIG. 5.

In step S807, the CPU 27 calculates an amount of unburned hydrocarbons adsorbed to the HC adsorbent 160 (adsorbed hydrocarbon amount) $HC_{ad}$ by multiplying the engine-discharged hydrocarbon amount $F_{OUT}$ calculated in step S805 by the catalyst-passing rate K and the characteristic adsorption performance factor S of the HC adsorbent 160 ($HC_{ad}=F_{OUT} \times K \times S$). The CPU 27 then ends the execution of the routine.

As is apparent from the above description, the embodiment calculates an amount of unburned hydrocarbons adsorbed to the HC adsorbent 160, taking the amount of wet fuel into consideration. Therefore, the embodiment makes it possible to precisely determine the amount of unburned hydrocarbons actually adsorbed to the HC adsorbent 160. As a result, the processing time for renewing the HC adsorbent 160 can be optimized in accordance with the amount of unburned hydrocarbons adsorbed to the HC adsorbent 160.

In the foregoing embodiment, the method of determining a degree of deterioration of the first emission control catalyst device 13 is a method in which the rich spike control is performed after the fuel cut control, and the time needed for the value of the output signal of the oxygen sensor 20 disposed downstream of the first emission control catalyst device 13 to shift from the lean side to the rich side is used as a basis for the determination. However, the above-described method is not intended to be restrictive. For example, it is also possible to use the frequency or amplitude of the value of the output signal of the oxygen sensor 20 as a basis for determining a degree of deterioration of the first emission control catalyst device 13.

Although the embodiment calculates an amount $HC_{ad}$ of hydrocarbons adsorbed to the HC adsorbent 160 taking the amount of wet fuel into consideration, it is also possible to determine an adsorbed hydrocarbon amount $HC_{ad}$ taking into consideration a property or characteristic of the fuel, the temperature of the exhaust system (e.g., the HC adsorbent bed temperature) occurring at the end of the unburned hydrocarbon adsorption control, the accumulated amount of air taken in up to the end of the unburned HC adsorption control, or the sum of changes in the engine load occurring during the execution of the unburned hydrocarbon adsorption control, in addition to the amount of wet fuel.

Figure 9:
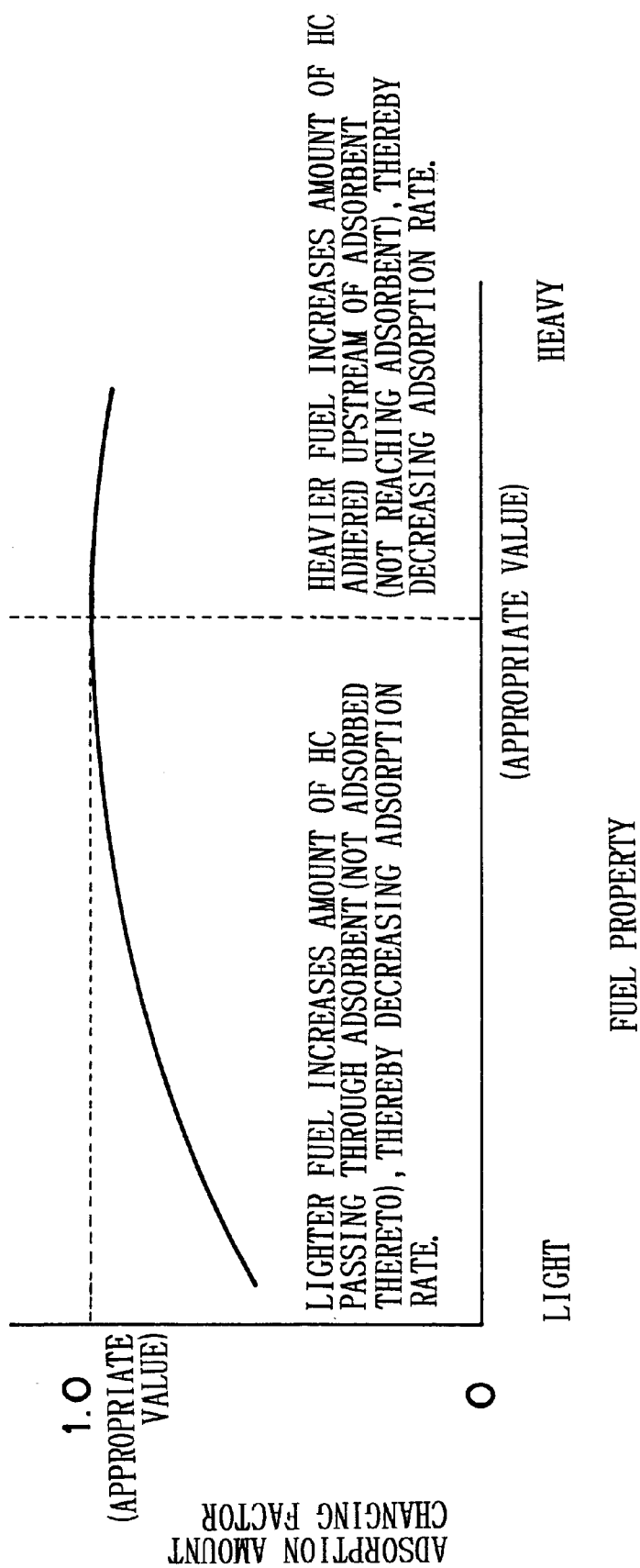
FIG. 9 is a graph indicating a relationship between a fuel property and the adsorption amount correction factor.

A fuel property or characteristic may be taken into consideration as follows. Use of a lighter fuel will increase the amount of unburned hydrocarbons passing through the HC adsorbent (not adsorbed thereto), thereby decreasing the rate of adsorption to the HC adsorbent. Use of a heavier fuel will increase the amount of unburned hydrocarbons adhering to wall surfaces of a passage extending upstream of the HC adsorbent, thereby decreasing the rate of adsorption to the HC adsorbent. Therefore, the CPU 27 may also determine an adsorption amount correction factor based on a map indicating a relationship between the adsorption amount correction factor and the aforementioned fuel property as indicated in FIG. 9. The CPU 27 would then use the thus-determined adsorption amount correction factor to correct the adsorbed HC amount $HC_{ad}$.

Figure 10:
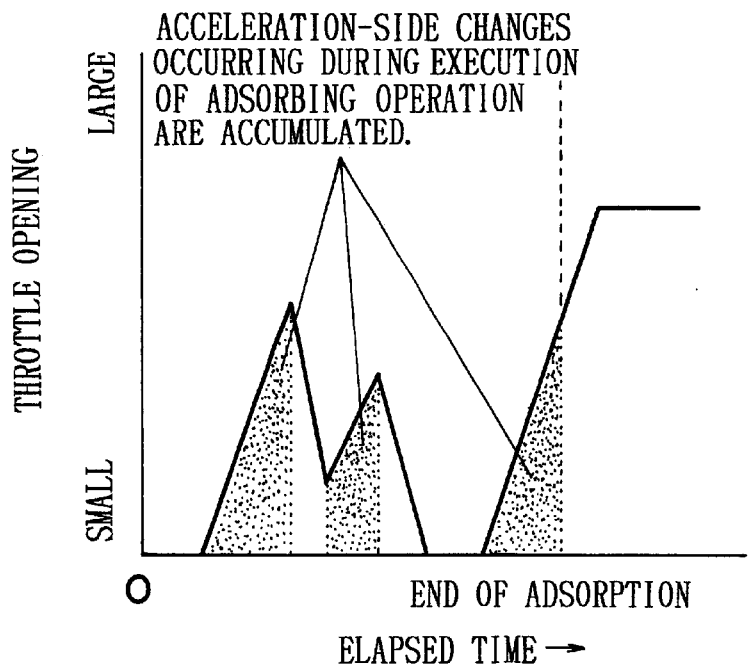
FIG. 10 is a diagram illustrating a method for determining a sum of changes in the opening of a throttle valve toward the acceleration side during an operation of adsorbing hydrocarbons to an HC adsorbent.
Figure 11:
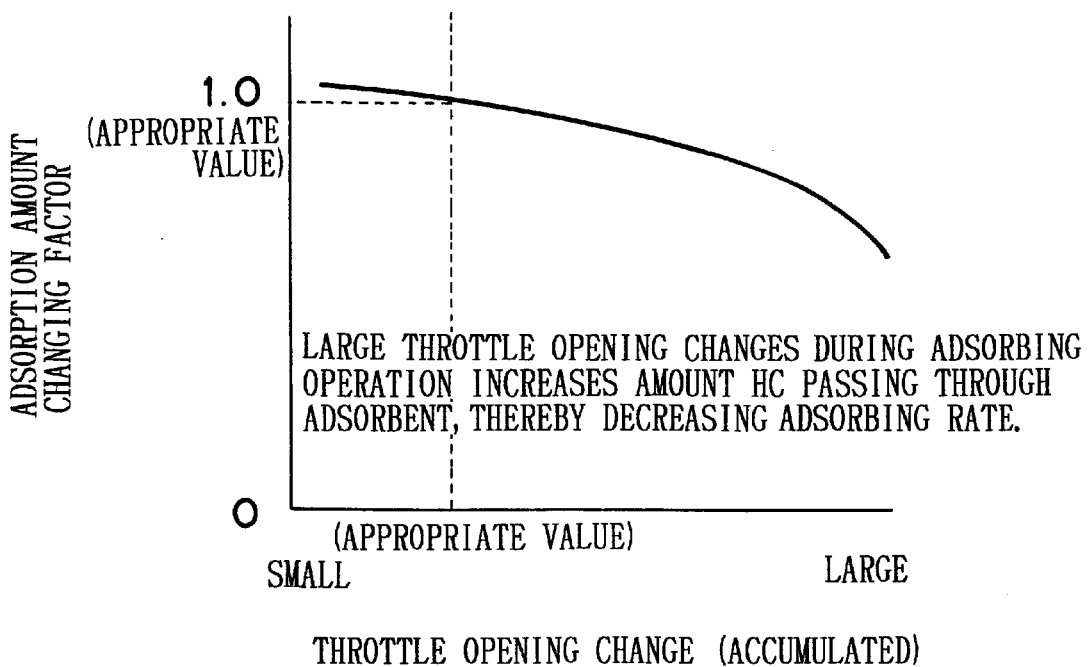
FIG. 11 is a graph indicating a relationship between the sum of changes in the opening of the throttle valve and the adsorption amount correction factor.

A sum of changes in the engine load occurring during execution of the unburned hydrocarbon adsorption control may be taken into consideration as follows. If there is a great change in the engine load, particularly, from the low load side to the high load side, a corresponding change in the exhaust gas flow rate causes unburned hydrocarbons to pass through the HC adsorbent 160, so that the amount of unburned hydrocarbons adsorbed to the HC adsorbent 160 decreases. Therefore, the CPU 27 may use the opening of the throttle valve 6 as a parameter for estimating an engine load to determine a sum of changes in the opening of the throttle valve 6 toward the acceleration side during the operation of adsorbing hydrocarbons to the HC adsorbent 160 as indicated in FIG. 10. In that case, the CPU 27 determines an adsorption amount correction factor based on a map indicating a relationship between the sum of changes in the opening of the throttle valve 6 and the adsorption amount correction factor as indicated in FIG. 11. Using the thus-determined adsorption amount correction factor, the CPU 27 corrects the adsorbed hydrocarbon amount $HC_{ad}$.

In a case where at least one of the intake camshaft and the exhaust camshaft in the internal combustion engine is provided with a variable valve timing mechanism for varying the open-close timing of the intake or exhaust valves, exhaust gas discharged into exhaust ports is returned into the corresponding combustion chambers (exhaust gas is caused to flow from exhaust ports back into the corresponding combustion chambers) during valve overlaps during which the intake valve open period and the exhaust valve open period overlap. Under such circumstances, therefore, the amount of unburned hydrocarbons discharged from the internal combustion engine varies in accordance with the amount of exhaust gas returned from the exhaust ports into the combustion chambers. In that case, it is preferred that the CPU 27 correct the engine-discharged hydrocarbon amount in accordance with the amount of exhaust gas returning from the exhaust ports into the combustion chambers.

In a case where the internal combustion engine is a high expansion ratio cycle engine in which the compression ratio and the expansion ratio can be set independently of each other, the intake valve closing timing is delayed to return portions of air-fuel mixture from combustion chambers toward the intake manifold via the corresponding intake ports during early periods of compression strokes, so that the compression start timing is substantially delayed and the actual compression ratio becomes smaller than the expansion ratio. Therefore, the amount of unburned hydrocarbons discharged from the internal combustion engine varies in accordance with the amount of air-fuel mixture returned from the combustion chambers toward the intake manifold (the amount of air-fuel mixture caused to flow from the combustion chambers toward the intake manifold). In that case, it is preferred that the CPU 27 correct the engine-discharged hydrocarbon amount in accordance with the amount of air-fuel mixture returned from the combustion chambers toward the intake manifold.

Furthermore, if an internal combustion engine lubricant (engine oil) adheres onto intake valves and the like, and forms deposits upon receiving heat, the surface areas of the intake valves and the like change and the amount of wet fuel correspondingly changes. Therefore, the CPU 27 may also determine an amount of wet fuel taking into consideration the amount of deposits formed.

The apparatus of the invention for calculating an amount of unburned fuel components adsorbed to a hydrocarbon adsorbent in an internal combustion engine calculates an amount of unburned fuel components adsorbed to the adsorbent, taking into consideration the amount of fuel component adhered to wall surfaces and the like of fuel component-conducting passages located upstream of the adsorbent, such as the intake passage, the combustion chambers, the exhaust passage and the like. Therefore, the apparatus is able to calculate an accurate amount of unburned hydrocarbons adsorbed to the adsorbent.

Furthermore, if a fuel property or characteristic is considered, more accurate calculation of an amount of unburned hydrocarbons adsorbed to the adsorbent becomes possible. This is because a lighter fuel more readily vaporizes and components thereof are more likely to flow through the adsorbent together with exhaust gas, and because a heavier fuel less readily vaporizes and components thereof are more likely to adhere to wall surfaces and the like of passages located upstream of the adsorbent.

If an emission control catalyst device is provided in a portion of the exhaust passage located upstream of the adsorbent, the amount of fuel components adhered to the emission control catalyst device is taken into consideration in calculating the amount of unburned fuel components adsorbed to the adsorbent. Therefore, it becomes possible to calculate an accurate amount of unburned fuel components adsorbed to the adsorbent even if a portion of the emission control catalyst device is activated, and consumed as an emission control agent or a reducer, or even if unburned fuel components are physically adsorbed to surfaces of the emission control catalyst device. In that case, the amount of unburned fuel components adsorbed to the adsorbent can be more accurately calculated by calculating an amount of fuel components adhered to the emission control catalyst device in accordance with the degree of deterioration of the emission control catalyst device.

The controller (ECU 25) can be implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the processes described herein and/or shown in FIGS. 5 and 8 can be used as the controller. A distributed processing architecture can be used for maximum data/signal processing capability and speed.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An apparatus for determining an amount of an unburned fuel component adhered to an adsorbent in an internal combustion engine, the apparatus comprising an adsorbent located in an exhaust passage of the internal combustion engine and that adsorbs an unburned fuel component from exhaust gas, and a controller that:

determines an amount of adhered fuel component, which is an amount of a fuel component adhered in a passage located upstream of the adsorbent; and determines the amount of the fuel component adsorbed to the adsorbent while taking into consideration the determined amount of adhered fuel component.

2. An apparatus according to claim 1, wherein the controller determines the amount of adhered fuel component, taking a fuel property of a fuel used by the internal combustion engine into consideration.

3. An apparatus according to claim 1, further comprising an emission control catalyst device provided in a portion of the exhaust passage located upstream of the adsorbent, wherein the controller determines the amount of adhered fuel component, taking into consideration an amount of the fuel component adhered to the emission control catalyst device.

4. An apparatus according to claim 1, wherein the controller further:

determines an amount of supplied fuel component that was not consumed during combustion; and determines the amount of the fuel component adsorbed to the adsorbent based on the determined amount of supplied fuel component that was not consumed during combustion and the determined amount of adhered fuel component.

5. An apparatus according to claim 1, further comprising a valve located in the exhaust passage, wherein the controller controls a position of the valve based on the determined amount of fuel component adsorbed to the adsorbent in order to control an amount of exhaust gas that passes through the adsorbent.

6. An apparatus according to claim 1, wherein the passage located upstream of the adsorbent includes a combustion chamber of the internal combustion engine.

7. An apparatus according to claim 3, wherein the controller determines the amount of the fuel component adhered to the emission control catalyst device in accordance with a determined deterioration condition of the emission control catalyst device.

8. An apparatus according to claim 4, wherein:

the controller determines the amount of the supplied fuel component that was not consumed during combustion, based on at least an amount of fuel injected from a fuel injection valve provided in the internal combustion engine, and the controller determines an amount of the fuel component adhered in a passage extending from the fuel injection valve to a combustion chamber of the internal combustion engine as at least part of the determined amount of adhered fuel component.

9. An apparatus according to claim 4, further comprising a return system that returns exhaust gas from one of an upstream side of the adsorbent and a combustion chamber of the internal combustion engine, into one of the combustion chamber and an intake passage of the internal combustion engine, wherein the controller determines the amount of the supplied fuel component that was not consumed during combustion, taking into consideration an amount of gas returned by the return system.

10. An apparatus according to claim 2, wherein the controller decreases the determined amount of adhered fuel component when the fuel is a lighter fuel.

11. An apparatus according to claim 7, wherein the controller decreases the determined amount of adhered fuel component as a degree of deterioration of the emission control catalyst increases.

12. A method for determining an amount of an unburned fuel component adsorbed to an adsorbent in an exhaust passage of an internal combustion engine, comprising:

fuel determining an amount of adhered fuel component, which is an amount of a fuel component adhered in a passage located upstream of the adsorbent; and determining the amount of the fuel component adsorbed to the adsorbent while taking into consideration the determined amount of adhered fuel component.

13. A method according to claim 12, wherein the amount of adhered fuel component is determined, taking a fuel property of a fuel used by the internal combustion engine into consideration.

14. A method according to claim 12, wherein an emission control catalyst device is provided in a portion of the exhaust passage located upstream of the adsorbent, and
wherein the amount of adhered fuel component is determined, taking into consideration an amount of the fuel component adhered to the emission control catalyst device.

15. A method according to claim 12, further comprising:
determining an amount of supplied fuel component that was not consumed during combustion; and
wherein the amount of fuel component adsorbed to the adsorbent is determined based on the determined amount of supplied fuel component that was not consumed during combustion and the determined amount of adhered fuel component.

16. A method according to claim 12, further comprising:
controlling a position of a valve located in the exhaust passage based on the determined amount of fuel component adsorbed to the adsorbent in order to control an amount of exhaust gas that passes through the adsorbent.

17. A method according to claim 12, wherein the passage located upstream of the adsorbent includes a combustion chamber of the internal combustion engine.

18. A method according to claim 13, wherein the determined amount of adhered fuel component is decreased when the fuel is a lighter fuel.

19. A method according to claim 14, wherein the amount of the fuel component adsorbed to the emission control catalyst device is determined in accordance with a determined deterioration condition of the emission control catalyst device.

20. A method according to claim 15, wherein:
the amount of the supplied fuel component that was not consumed during combustion is determined based on at least an amount of fuel injected from a fuel injection valve provided in the internal combustion engine, and
determining the amount of adhered fuel component at least in part includes determining an amount of the fuel component adhered in a passage extending from the fuel injection valve to a combustion chamber of the internal combustion engine.

21. A method according to claim 15, further comprising returning gas from one of an upstream side of the adsorbent and a combustion chamber of the internal combustion engine, into one of the combustion chamber and an intake passage of the internal combustion engine, and
wherein the amount of the supplied fuel component that was not consumed during combustion is determined, taking into consideration an amount of gas returned from one of the upstream side of the adsorbent and the combustion chamber of the internal combustion engine into one of the combustion chamber and the intake passage of the internal combustion engine.

22. A method according to claim 19, wherein the determined amount of adhered fuel is decreased as a degree of deterioration of the emission control catalyst increases.

* * * * *